Patented Dec. 2, 1952

2,620,338

UNITED STATES PATENT OFFICE 2,620,338

ADDUCTS OF 22-ACYLOXYBISNOR-5,7,9(11),-20(22)-CHOLATETRAENES

Robert H. Levin and A. Vern McIntosh, Jr., Kalamazoo, Mich., assignors to The Upjohn Company, Kalamazoo, Mich., a corporation of Michigan No Drawing. Application August 23, 1949, Serial No. 111,974

10 Claims. (Cl. 260—239.55)

The present invention relates to adducts of 22-acyloxybisnor - 5,7,9(11),20(22) - cholatetraenes with certain dienophilic acid anhydrides and esters, and to a process for the production thereof.

The compounds of the present invention may be represented by the structural formula:

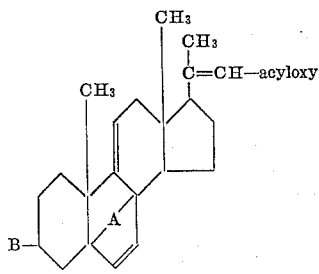

wherein B is an acyloxy group derived from an organic carboxylic acid containing from one to ten carbon atoms, inclusive; A is an adduct radical derived from a dienophile selected from the group consisting of maleic acid anhydride and maleic acid diesters wherein the esterifying group contains from one to eight carbon atoms, inclusive; and wherein "acyloxy" is an acyloxy group derived from an organic carboxylic acid containing from one to ten carbon atoms, inclusive.

It is an object of the present invention to provide a group of novel compounds which are useful in the preparation of steroid compounds containing an oxygen atom at carbon atom eleven. A further object of the invention is the provision of a process for the production of the novel compounds, the 22 - acyloxybisnor - 5,7,9(11),20-(22)-cholatetraenes. Other objects of the invention will become apparent hereinafter.

The compounds of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, particularly those oxygenated at carbon atom eleven, as well as to investigate the biological activity of the adducts themselves and their transformation products. The importance of such investigation is moreover emphasized by the acute shortage of adrenal cortical hormones, and the absence of any present suggestion for alleviation of the said shortage except through organic synthesis.

Novel compounds of the present invention which are of particular interest are those compounds of the above generic formula wherein B represents an ester of the 3-hydroxyl group with a carboxylic acid containing up to and including eight carbon atoms. Among the acids which can be used are formic, acetic, propionic, butyric, valeric, hexanoic, heptanoic, octanoic, succinic, glutaric, cyclopentanoic, benzoic, toluic, napthoic, and the like. Preferred acids are those containing from one to eight carbon atoms, inclusive, and especially such lower-aliphatic acids. The acids may also contain substituents, such as halo, alkyl, and methoxy, which are non-reactive under the reaction conditions employed. The adduct bridge (—A—) in such compounds may be represented by the graphic formula:

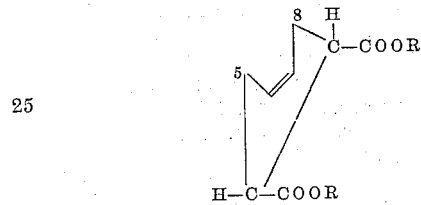

wherein R represents the organic residue of an alcohol. Such esters include the methyl, ethyl, propyl, isopropyl, butyl, isobutyl, lauryl, octyl, cyclohexyl, benzyl, and the like esters. The esterifying radical may also contain non-reactive substituents, such as halo, methoxy, or hydroxy, if desired. While the esters of the maleic acid adduct are described herein with particular reference to the methyl esters, the preferred embodiment of R is a lower-alkyl radical containing from one to eight carbon atoms, inclusive. Alternatively, the adduct may be depicted by the graphic formula:

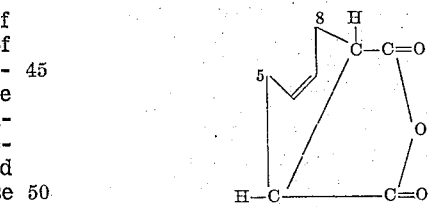

which is representative of the maleic anhydride adduct.

The compounds of the invention are usually colorless crystalline solids, which are insoluble in water, soluble in ether, halogenated hydrocarbons, acetone, ethyl acetate, and benzene. These anhydride adducts are readily converted into ester adducts by esterification with conventional reagents such as the diazoalkanes [Wilds et al., J. Org. Chem. 13, 763 (1948)].

Adducts of 22-acyloxybisnor-5,7,9(11),20(22)-cholatetraenes (22-enol esters of 3-acyloxybisnor-5,7,9(11)-cholatrien-22-als) are conveniently prepared by subjecting an adduct of a 3-acyloxybisnor-5,7,9(11)-cholatrien-22-al, of the formula:

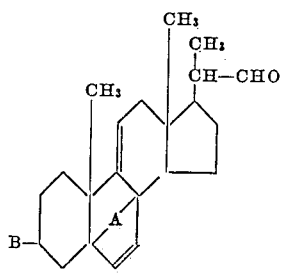

wherein A and B have the values previously given, to the action of an acid anhydride or an acid halide in the presence of an alkaline salt of the acid. The starting adducts of 3-acyloxybisnor-5,7,9(11)-cholatrien-22-als can be prepared from adducts of 3-esters of dehydroergosterol by selective oxidation as described and claimed in the copending application Serial 111,100 of Robert H. Levin, filed August 18, 1949, and as more fully described hereinafter.

The 3-esters of dehydroergosterol, from which the 3 - acyloxybisnor - 5,7,9(11) - cholatrien- 22-al adducts are prepared, can be synthesized in several ways starting with ergosterol. For example, ergosterol can be transformed to dehydroergosterol with mercuric acetate according to known methods [Windaus et al., Ann. 465, 157 (1928)] and the 3-hydroxyl group of the dehydroergosterol acylated by known procedure. Alternatively, the 3-hydroxyl group of ergosterol can be acylated prior to the preparation of the dehydro derivative, a procedure which is particularly preferred in the preparation of the 3-acetoxy derivative. The adducts of dehydroergosterol are then prepared by the addition of maleic anhydride or the like to dehydroergosterol or a 3-ester thereof according to known methods [Honigmann, Ann. 508, 89 (1934)]. The anhydrides can then be converted to their corresponding acids and esters if desired.

The ester group, when present in the 3-position of the dehydroergosterol, is for the purpose of protecting the 3-hydroxyl group in subsequent chemical reactions. For this purpose any convenient ester of an organic carboxylic acid, which is non-reactive under the conditions of the reaction, is suitable. The preferred acids are the fatty acids such as formic, acetic, propionic, butyric, valeric, hexanoic, heptanoic, octanoic; dibasic acids such as malonic, succinic, phthalic, cycloaliphatic acids such as cyclopentanoic and cyclohexanoic; and aromatic acids such as benzoic, toluic, naphtoic, and the like. The acids may also contain substituents such as halogen, alkyl, the methoxyl radical, and the like, and these substituents will be carried throughout the synthesis and appear in the final cholatetraene product. If desired, the acyl group can be changed to another acyl group by saponifying the ester to give a 3-hydroxy compound, which can then be re-esterified as previously described.

A preferred method for preparing some of the dehydroergosteryl adducts comprises the saponification of a 3-acyloxy adduct of dehydroergosterol with dilute alkali followed by acidification. The 3-hydroxy dicarboxylic acid thus formed can be converted to the 3-hydroxy anhydride by heat, or it can be converted to any desired 3-acyloxy anhydride adduct by heating under reflux with the appropriate acid anhydride or chloride in pyridine solution. Dialkyl esters of the previously mentioned dicarboxylic acid adducts can be prepared by subjecting the acid to the action of an esterification reagent such as a diazoalkane [Wilds et al., J. Org. Chem. 13, 763 (1948)], e. g., diazomethane, diazoethane, diazobutane, and the like.

The selective oxidation of an adduct of dehydroergosterol, or a 3-ester thereof, to produce an adduct of 3-hydroxybisnor-5,7,9(11)-cholatrien-22-al, or a 3-ester thereof, is accomplished by dissolving the dehydroergosteryl adduct in a suitable solvent, cooling to between about minus 80 to plus 30 degrees centigrade, and passing ozone into the solution until about 1.0 to 1.25 moles of ozone per mole of adduct have been absorbed. The temperature of the solution should be maintained below plus 30 degrees centigrade, preferably between a temperature of minus 30 and minus 70 degrees centigrade, during the addition of the ozone, although temperatures as low as minus 80 and as high as plus 30 degrees centigrade are operative. The lower temperatures of the preferred range are readily obtained by cooling the solution of the adduct with a bath of solid carbon dioxide in acetone or the like, although various other methods of cooling can be used. Many of the customary solvents used in ozonizations such as chloroform, acetic acid, carbon tetrachloride, ethylene chloride, methylene chloride, and the like can be used. The ozonides are then decomposed under reducing conditions, that is, in the absence of oxidizing agents, whether added or formed in the course of the reaction by products of decomposition of the ozonide. This means that excess oxygen formed by decomposition of the ozonide must be prevented from forming hydrogen peroxide by combining with any moisture present, and that molecular oxygen must be prevented from oxidizing the aldehyde thus formed. This can be conveniently accomplished by decomposing the ozonide in glacial acetic acid by the addition of finely-powdered zinc.

As is conventional with ozonizations when conducted in solvents other than glacial acetic acid, the solvent used for ozonization is replaced, after completion of the ozonization, by adding glacial acetic acid and removing the lower-boiling solvent by fractional distillation. Alternatively, the solvent can be removed by careful warming under reduced pressure prior to the addition of glacial acetic acid if desired.

After decomposition of the ozonide and removal of the zinc, the aldehyde can be recovered by diluting the acetic acid with water, or in other conventional manner, such as by formation of an aldehyde derivative, e. g., the dinitrophenylhydrazone.

According to the method of the present invention, adducts of 22-acyloxybisnor-5,7,9(11),-20(22)-cholatetraenes [22-enol esters of adducts of 3-acyloxybisnor-5,7,9(11)-cholatrien-22-als] can be conveniently prepared by heating the corresponding 3-hydroxy or acyloxy aldehyde maleic acid, maleic acid anhydride, or maleic acid ester adduct with a large excess of an organic carboxylic acid anhydride in the presence of a small amount of the alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, and octanoic anhydrides, as well as benzoic acid anhydride, ortho-toluic acid anhydride, naphthoic acid anhydride, and the like, are also operative. The acid anhydrides can also be substituted by non-reactive groups, such as halo, alkyl, and methoxy, as in the case of chloroacetic, ortho-toluic, or methoxybenzoic acid anhydrides. The reaction can be conveniently followed by observing the color change in the reaction mixture, optimum yields being obtained by discontinuing the application of heat when the color of the solution changes from yellow to brown. Ordinarily the reaction is heated at about 140 degrees centigrade for from about four to six hours, but temperatures as low as 100 and as high as 180 degrees centigrade are also operative. The reaction is usually conducted at the boiling point of the anhydride, but in the case of the higher-boiling anhydrides, such as benzoic anhydride, a suitable temperature control, such as from 100 to 150 degrees centigrade, must be used, since the adduct otherwise tends to decompose in the higher temperature range. If a 3-hydroxy aldehyde adduct is thus reacted with an anhydride, the hydroxyl group will be acylated, and, similarly, if a maleic acid adduct is used instead of a diester or an anhydride, the anhydride will be formed. The enol ester product can be isolated by removing the excess anhydride under reduced pressure, or by other conventional procedure, and is sufficiently pure for most purposes, but can be further purified by recrystallization from acetone-water, acetone-pentane, or like pairs of solvents, if desired.

The following preparations and examples are given as illustrative only, and are not to be construed as limiting the invention.

*Preparation 1.—Dimethyl maleate adduct of dehydroergosteryl benzoate*

To a solution of 21 grams of the dimethyl maleate adduct of dehydroergosterol in 69 milliliters of warm pyridine was added 9.5 milliliters of benzoyl chloride. After standing at room temperature for fifteen minutes, the mixture was poured into 1400 milliliters of ice-water and the solid removed by filtration, dried, and recrystallized from acetone. There was thus obtained 26.4 grams of dimethyl maleate adduct of dehydroergosteryl benzoate, melting at 203 to 205.5 degrees centigrade.

*Preparation 2.—Dimethyl maleate adduct of dehydroergosteryl acetate*

In a manner essentially that described in preparation 1, the dimethyl maleate adduct of dehydroergosteryl acetate, melting at 177 to 179 degrees centigrade, was prepared from the dimethyl maleate adduct of dehydroergosterol and acetyl chloride.

*Preparation 3.—Dimethyl maleate adduct of dehydroergosteryl formate*

A solution of six grams of dimethyl maleate adduct of dehydroergosterol in fifty milliliters of 87 per cent formic acid was heated under reflux for one hour, cooled, and the dimethyl maleate adduct of dehydroergosteryl formate filtered therefrom. Upon crystallization from acetone, the purified material melted at 177.5 to 178.5 degrees centigrade.

*Preparation 4.—Maleic acid adduct of dehydroergosterol*

Twelve grams of maleic anhydride adduct of dehydroergosteryl acetate was dispersed in 300 milliliters of methyl alcohol, whereafter a solution of 2.6 grams of potassium hydroxide in 300 milliliters of water was added to the suspension and the reaction mixture heated under reflux for 135 minutes, 200 milliliters of water being added portionwise during the reaction period. The hot solution was filtered to remove any undissolved solid, cooled, and acidified. After washing the precipitate with water and drying, there was obtained 9.2 grams of the maleic acid adduct of dehydroergosterol, melting at 190–192 degrees centigrade.

*Preparation 5.—Maleic anhydride adduct of 3-heptanoyloxy dehydroergosterol*

The maleic acid adduct of dehydroergosterol from Preparation 4 was dissolved in a mixture of seven milliliters of warm pyridine and fourteen milliliters of heptylic anhydride, and the mixture heated under reflux for one hour. About eighty per cent of the reaction solvent was removed under reduced pressure, and the residue then dissolved in methyl alcohol. The methyl alcohol solution was concentrated and cooled to yield 4.8 grams of the maleic anhydride adduct of 3-heptanoyloxydehydroergosterol, melting at 186–191.5 degrees centigrade.

*Preparation 6.—Maleic anhydride adduct of 3-beta-acetoxybisnor-5,7,9(11)-cholatrien-22-al and its 2,4-dinitrophenylhydrazone*

A solution of 5.35 grams of the maleic anhydride adduct of 3-beta-acetoxydehydroergosterol in 107 milliliters of methylene chloride was cooled to about minus seventy degrees centigrade and ozonized until 505 milligrams of ozone had been absorbed. The temperature of the solution was then gradually raised to about plus ten to fifteen degrees centigrade, whereupon seventy milliliters of glacial acetic acid was added and the methylene chloride removed under reduced pressure. Seven grams of zinc dust was then added to the cold solution at a uniform rate over a period of ten minutes, while keeping the reaction temperature below plus twenty degrees centigrade. After being stirred for fifteen minutes, the mixture was filtered and the filtrate poured into water. There was thus obtained 4.31 grams of maleic anhydride adduct of 3-beta-acetoxybisnor-5,7,9(11)-cholatrien-22-al, a fine white powder which melted at 187–197 degrees centigrade.

To a solution of 0.30 gram of the maleic anhydride adduct of 3-beta-acetoxybisnor-5,7,9(11)-cholatrien-22-al in thirty milliliters of ethanol was added twenty milliliters of alcohol containing one per cent 2,4-dinitrophenylhydrazine and three per cent concentrated hydrochloric acid. The mixture was allowed to stand for one hour at room temperature and then placed in a refrigerator to complete precipitation of the yellow crystals. The precipitate was then collected and recrystallized from a mixture of chloroform and alcohol, to give the 2,4-dinitrophenylhydrazone of the maleic anhydride adduct of 3-beta-acetoxybisnor-5,7,9(11)-cholatrien-22-al, melting at 269–271 degrees centigrade.

*Preparation 7.—Maleic anhydride adduct of 3-beta-acetoxybisnor-5,7,9(11)-cholatrien-22-al*

A two-liter, round-bottom flask was charged with fifty grams (0.93 mole) of dehydroergosteryl acetate maleic anhydride adduct and one liter of methylene chloride. The solution was cooled to Dry Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 per cent) of ozone being passed into the solution. The reaction mixture was transferred to a two-liter, round-bottom flask fitted with a capillary and a condenser for downward distillation, 200 milliliters of acetic acid added, and the methylene chloride distilled over in vacuo at forty degrees centigrade or below. The flask was then placed in a water bath and fitted with a stirrer. An additional 200 milliliters of acetic acid was added and the ozonide decomposed by the addition of fifty grams of zinc dust. The zinc dust was added in portions over a period of twenty to thirty minutes while the solution was stirred and the temperature maintained at seventeen to twenty degrees centigrade. After addition, the mixture was stirred for another twenty minutes and then filtered. The precipitated zinc dust was washed by filtering 100 milliliters of acetic acid therethrough, and the filtrate gradually diluted with water (1100 to 1200 milliliters) until the product had been drowned out. The product was then cooled in the refrigerator overnight and filtered. The yield of crystalline product was 42 grams, assaying 89–95 per cent of the desired aldehyde.

*Preparation 8*

In a manner essentially that described in Preparation 6, the following compounds were prepared.

1. Maleic anhydride adduct of 3-beta-formoxybisnor-5,7,9(11)-cholatrien-22-al, melting at 95–130 degrees centigrade. 2,4-dinitrophenylhydrazone, melting at 165–168 degrees centigrade.
2. Maleic anhydride adduct of 3-beta-heptanoyloxybisnor-5,7,9(11)-cholatrien-22-al, melting at 197.5–199 degrees centigrade. 2,4-dinitrophenylhydrazone, melting at 253–257 degrees centigrade.
3. Dimethyl maleate adduct of 3-beta-benzoyloxybisnor-5,7,9(11)-cholatrien-22-al, melting at 183–187 degrees centigrade. 2,4-dinitrophenylhydrazone, melting at 224–249 degrees centigrade.
4. Dimethyl maleate adduct of 3-beta-acetoxybisnor-5,7,9(11)-cholatrien-22-al, melting at 172–178 degrees centigrade. 2,4-dinitrophenylhydrazone, melting at 238 to 244 degrees centigrade.
5. Dimethyl maleate adduct of 3-hydroxybisnor-5,7,9(11)-cholatrien-22-al, melting at 163–170 degrees centigrade. 2,4-dinitrophenylhydrazone, melting at 250–254 degrees centigrade.

In a manner similar to the above, the maleic anhydride adduct of 3-hydroxybisnor-5,7,9(11)-cholatrien-22-al is obtained from dehydroergosteryl maleic anhydride adduct; the maleic acid adduct of 3-hydroxybisnor-5,7,9(11)-cholatrien-22-al is obtained from dehydroergosteryl maleic acid adduct; and 3-acyloxybisnor-5,7,9(11)-cholatrien-22-al maleic acid adducts are obtained from the maleic acid adduct of 3-acyloxydehydroergosterols.

*Preparation 9.—Dimethyl maleate adduct of 3-hydroxybisnor-5,7,9(11)-cholatrien-22-al*

A solution of 2.69 grams (.005 mole) of the dimethyl ester of the maleic acid adduct of dehydroergosterol in eighty milliliters of methylene chloride, cooled by a Dry Ice and trichloroethane bath, was treated with ozonized oxygen until 247.36 milligrams (.0051 mole) of ozone was absorbed. The solution was then allowed to warm to room temperature, whereafter thirty milliliters of acetic acid was added and the methylene chloride removed in vacuo. While cooling in a water-bath at fifteen degrees centigrade, four grams of zinc dust was added in portions with stirring, the temperature being maintained between fifteen and twenty degrees centigrade. Stirring was continued for another fifteen minutes, whereafter the zinc was separated by filtration. The filtrate was diluted with water to cloudiness, extracted with ether, the ether extract washed with sodium bicarbonate and then with water to neutrality, the solution then dried over sodium sulfate and evaporated to dryness in vacuo. The residue was crystallized from acetic acid and water, giving 1.92 grams (81.5 per cent of the theoretical), melting point 91–97 degrees centigrade, which yielded a dinitrophenylhydrazone derivative in 72.5 per cent yield, melting point 212–238 degrees centigrade. The aldehyde was recrystallized and found to have a purified melting point of 163–170 degrees centigrade, while the dinitrophenylhydrazone derivative was recrystallized until a melting point of 250–254 degrees centigrade was attained.

*Example 1.—The maleic anhydride adduct of 3-beta-acetoxy-22-acetoxybisnor-5,7,9(11), 20(22)-cholatetraene*

A mixture of twenty grams of the maleic anhydride adduct of 3-beta-acetoxybisnor-5,7,9-(11)-cholatrien-22-al, six grams of anhydrous sodium acetate, and 600 milliliters of acetic anhydride, was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3-beta-acetoxy-22-acetoxybisnor-5,7,9(11),20(22)-cholatetraene, which melted at 186 to 193 degrees centigrade. Recrystallization of the crude product from a mixture of acetone and pentane raised the melting point to 200.5 to 202 degrees centigrade.

*Example 2*

In a manner essentially that described in Example 1, the following compounds were prepared:

1. The dimethyl maleate adduct of 3-beta-benzoyloxy-22-acetoxybisnor-5,7,9(11),20(22)-cholatetraene, which melted at 210 to 211 degrees centigrade.
2. The dimethyl maleate adduct of 3-beta-acetoxy-22-acetoxybisnor-5,7,9(11),20(22)-cholatetraene, which melted at 181 to 183 degrees centigrade.

In the same manner as given above, 22-acyloxy, e. g., formoxy, acetoxy, propionoxy, butyroxy, valeroxy, hexanoyloxy, octanoyloxy, benzoyloxy, naphthoyloxy, and the like 3-acyloxy-bisnor-5,7,9(11),20(22)-cholatetraene adducts, are obtained from the compounds of Preparations 6, 7, and 8. Such representative compounds include 3-formoxy- 22 -acetoxybisnor - 5,7,9,(11),20(22) - cholatetraene, 3-propionoxy - 22-acetoxybisnor-5,7,9(11),20(22) - cholatetraene, 3,22-dipropionoxybisnor-5,7,9(11),20(22) - cholatetraene, 3,22-dibenzoyloxybisnor - 5,7,9(11),20(22)-cholatetraene, and 3-heptanoyloxy-22-octanoyloxybisnor-5,7,9(11),20(22)-cholatetraene adducts with maleic anhydride or maleic acid esters such as the dimethyl maleate, diethyl maleate, dipropyl maleate, diisopropyl maleate, dibutyl maleate, dioctyl maleate, dibenzyl maleate, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. Adducts of 3,22-diacyloxybisnor-5,7,9(11),-20(22)-cholatetraenes of the formula:

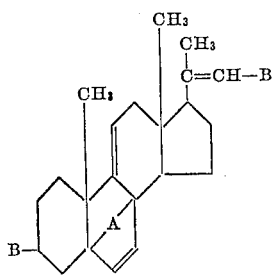

wherein B is an unsubstituted acyloxy group of the formula RCOO—, wherein R is selected from hydrogen and a hydrocarbon radical containing from one to nine carbon atoms, inclusive; and wherein A is an adduct radical derived from a dienophile selected from the group consisting of maleic acid anhydride and maleic acid diesters wherein the esterifying group is a lower-alkyl group containing from one to eight carbon atoms, inclusive.

2. Maleic anhydride adduct of 3,22-diacetoxybisnor-5,7,9(11),20(22)-cholatetraene.

3. Dimethyl maleate adduct of 3-benzoyloxy-22-acetoxybisnor-5,7,9(11),20(22)-cholatetraene.

4. Dimethyl maleate adduct of 3,22-diacetoxybisnor-5,7,9(11),20(22)-cholatetraene.

5. A process for the production of an adduct of a 3,22-diacyloxybisnor-5,7,9(11),20(22)-cholatetraene, which includes the steps of (a) heating together, at a temperature between about 100 and 180 degrees centigrade, (1) a bisnor-5,7,9(11)-cholatrien-22-al of the formula:

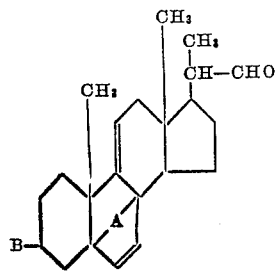

wherein B is selected from the group consisting of hydroxyl and an acyloxy group derived from an organic carboxylic acid containing from one to ten carbon atoms, inclusive, and A is an adduct radical derived from a dienophile selected from the group consisting of maleic acid, maleic acid anhydride, and diesters of maleic acid, containing from one to eight carbon atoms, inclusive, in the esterifying group, together with an excess of (2) the anhydride of an organic carboxylic acid containing from one to ten carbon atoms, inclusive, in the presence of (3) an alkali metal salt of the acid corresponding to the anhydride (2) employed; (b) removing excess anhydride (2); and (c) recovering the thus-produced 3,22-diacyloxybisnor - 5,7,9(11),20(22) - cholatetraene adduct from the reaction product.

6. The method of claim 5, wherein the acid anhydride (2) is acetic acid anhydride.

7. The process of claim 5, wherein the starting adduct is the maleic anhydride of a 3-acyloxybisnor-5,7,9(11)-cholatrien-22-al.

8. The process of claim 5, wherein the starting adduct is the dimethylmaleate adduct of a 3-acyloxybisnor-5,7,9(11)-cholatrien-22-al.

9. The process of claim 5, wherein the starting adduct is the dimethylmaleate adduct of 3-benzoyloxybisnor-5,7,9(11)-cholatrien-22-al.

10. A process for the production of an adduct of a 3,22-diacyloxybisnor-5,7,9(11),20(22)-cholatetraene, which includes the steps of (a) heat-together, at a temperature between about 100 and 180 degrees centigrade, (1) a bisnor-5,7,9(11)-cholatrien-22-al of the formula:

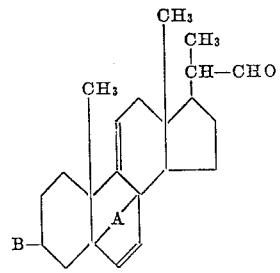

wherein B is selected from the group consisting of hydroxyl and an acyloxy group derived from an organic carboxylic acid containing from one to ten carbon atoms, inclusive, and A is an adduct radical derived from a dienophile selected from the group consisting of maleic acid, maleic acid anhydride, and diesters of maleic acid, containing from one to eight carbon atoms, inclusive, in the esterifying group, together with an excess of (2) the anhydride of an organic carboxylic acid containing from one to ten carbon atoms, inclusive, in the presence of (3) a compound selected from the group consisting of sulfuric acid, a sulfonic acid, and an alkali-metal salt of the acid corresponding to the anhydride (2) employed; (b) removing excess anhydride (2); and (c) recovering the thus-produced 3,22-diacyloxybisnor - 5,7,9(11),20(22) - cholatetraene adduct from the reaction product.

ROBERT H. LEVIN.
A. VERN McINTOSH, Jr.

No references cited.